(12) United States Patent
Spijker et al.

(10) Patent No.: US 9,666,879 B2
(45) Date of Patent: May 30, 2017

(54) SYSTEM AND METHOD FOR DESULFATION OF A LEAD-ACID BATTERY

(71) Applicant: Ford Global Technologies, Dearborn, MI (US)

(72) Inventors: Engbert Spijker, Nuth (NL); Eckhard Karden, Aachen (DE); Armin Warm, Aachen (DE)

(73) Assignee: Ford Global Technologies, Dearborn, MI (US)

( * ) Notice: Subject to any disclaimer, the term of this patent is extended or adjusted under 35 U.S.C. 154(b) by 309 days.

(21) Appl. No.: 14/492,057

(22) Filed: Sep. 21, 2014

(65) Prior Publication Data

US 2015/0102763 A1 Apr. 16, 2015

(30) Foreign Application Priority Data

Oct. 13, 2013 (DE) .......................... 10 2013 220 643

(51) Int. Cl.
*H02J 7/00* (2006.01)
*H01M 6/50* (2006.01)
*H02J 7/14* (2006.01)
*H01M 6/52* (2006.01)

(52) U.S. Cl.
CPC .............. *H01M 6/50* (2013.01); *H01M 6/52* (2013.01); *H02J 7/0054* (2013.01); *H02J 7/0075* (2013.01); *H02J 7/0077* (2013.01); *H02J 7/1423* (2013.01); *Y02T 10/7005* (2013.01); *Y02W 30/84* (2015.05)

(58) Field of Classification Search
CPC ...................................................... H02J 7/0054
USPC .......................................................... 320/104
See application file for complete search history.

(56) References Cited

U.S. PATENT DOCUMENTS

| 6,114,775 | A | * | 9/2000 | Chung ..................... B60K 6/46 180/65.245 |
| 6,166,517 | A | * | 12/2000 | Wakashiro ............. B60K 6/485 180/65.26 |
| 7,786,702 | B1 | * | 8/2010 | Chait ..................... H02J 7/0073 320/104 |
| 8,452,490 | B2 | * | 5/2013 | Lakirovich ......... H01M 10/443 320/103 |
| 2007/0024219 | A1 | * | 2/2007 | Aoyagi ............... B60L 11/1851 318/139 |
| 2013/0314041 | A1 | * | 11/2013 | Proebstle ............ F02N 11/0866 320/109 |

FOREIGN PATENT DOCUMENTS

DE 102011054582 A1 4/2012
EP 2041862 B1 4/2009

* cited by examiner

*Primary Examiner* — Yalkew Fantu
(74) *Attorney, Agent, or Firm* — Angela M. Brunetti; Frank MacKenzie

(57) ABSTRACT

Desulfation of a primary battery of an on-board power system of a motor vehicle takes place during operation of an internal combustion engine using electrical energy transmitted to the primary battery front the internal combustion engine. When the internal combustion engine is switched off, or otherwise not operational, desulfation of the primary battery continues using a secondary battery wherein electrical energy is transmitted to the primary battery from the secondary battery.

14 Claims, 4 Drawing Sheets

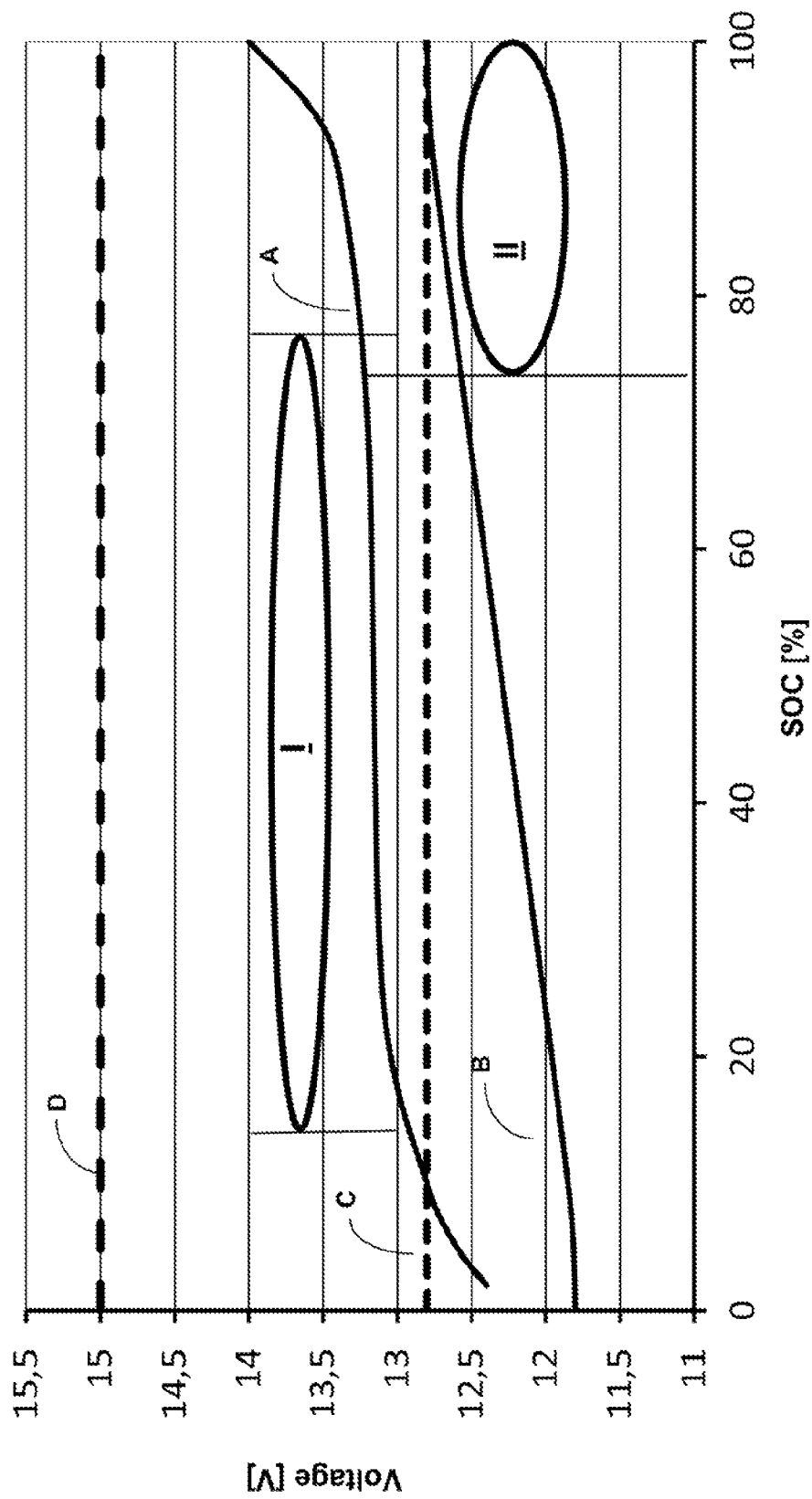

SYSTEM AND METHOD FOR DESULFATION OF A LEAD-ACID BATTERY

CROSS REFERENCE

The inventive subject matter is a continuation of foreign filed application number DE 10 2013 220643.7 filed Oct. 14, 2013, whose subject matter is incorporated by reference herein and provides the basis for a claim of priority of invention under 35 U.S.C. §119.

TECHNICAL FIELD

The inventive subject matter is directed to an on-board power supply system for a motor vehicle and more particularly to battery management for an on-board power supply system for a motor vehicle.

BACKGROUND

Lead-acid batteries, which are used in motor vehicles with start/stop function and are also used in micro-hybrid motor vehicles, are prone to build up of sulfate layers, particularly when they are operated with only a partial charge. Lead-acid batteries require a refreshment or desulfation cycle at predetermined intervals in order to remove sulfate layers. For efficient refreshment, it is typically necessary for the lead-acid battery to be chanted for a continuous period, preferably 24 hours, at a maximum voltage, i.e. 15V. However, such extended charging periods cannot be ensured when the duration of a journey is typically much shorter, on the order of twenty to thirty minutes. In addition, operation of the motor vehicle at the necessary high voltage for the extended period of time necessary to properly achieve desulfation leads to an increase in fuel consumption of the motor vehicle.

DE 10 2011 054 582 A1 discloses, inter alia, a device for controlling a battery system, wherein a load secondary battery and a lithium secondary battery with higher power density and energy density relative to the lead secondary battery are used. Semiconductor switches in the form of MOSFETs are electrically conductively connected both to the alternator and to the lead secondary battery and the lithium secondary battery and are actuated via a controller (ECU) in such a way that the lithium secondary battery is charged close to a setpoint charge value daring the operation of the internal combustion engine. A variable setting unit sets this setpoint charge value in a variable manner on the basis of a state variable dependent on a regenerative state of charge and/or state of discharge of the lithium secondary battery.

EP 2 041 862 B1 discloses, inter alia, an electrical energy source and a method for controlling an electrical energy source, wherein a high-voltage battery in the form of a lithium-ion battery and a low-voltage battery in the form of a lead-acid battery are also used.

There is a need for a method for operating an on-board power supply system of a motor vehicle in such a manner that enables an effective refreshment or destination of a primary battery while saving as much fuel as possible.

SUMMARY

The inventive subject matter addresses the need to operate an on-board power supply system of a motor vehicle in such manner that it effectively refreshes a battery while saving as much fuel as possible. For a motor vehicle having an internal combustion engine, a primary battery source and a secondary battery source, desulfation of the primary battery takes place during operation of the internal combustion engine using electrical energy transmitted to the primary battery from the internal combustion engine. According to the inventive subject matter, when the internal combustion engine is switched off or is not operational, desulfation of the primary battery continues to take place using a secondary battery wherein electrical energy is transmitted to the primary battery from the secondary battery.

The inventive subject matter expands, or extends, the refreshment or desulfation cycle of a primary lead-acid battery with use of the secondary (lithium-based) battery. The secondary battery is used as an auxiliary battery to enable continuation of the destination cycle during periods in which the internal combustion engine is switched off and is not operating. The secondary battery also creates the possibility of rapid recharging of the primary battery.

Since the secondary battery is clamped to the primary battery when the internal combustion engine or motor vehicle is switched off, charge is transferred from the secondary battery to the primary battery. A continuation of the desulfation cycle is thus made possible. In spite of the lower voltage, for example typically 13 V, the charging is continued (at lower rate). The secondary battery may optionally be unclamped, or disconnected from the primary battery, when fully discharged. During the next journey of the motor vehicle, the complete charge and discharge cycle can then be repeated. Both batteries are charged during the journey of the motor vehicle, and the discharge process can be continued in the lead-acid battery when the internal combustion engine or motor vehicle is switched off, until the desulfation cycle of the primary battery is complete.

The charging mode at maximum voltage advantageously enables the charging of both the primary (lead-acid) battery and the secondary (lithium-based) battery. Here, the battery state of charge (SOC) of the secondary battery can be newly calibrated, since the 100% charged state is a defined battery state. Furthermore, a battery sensor of the primary (lead-acid) battery can also be newly calibrated.

In accordance with an embodiment of the inventive subject matter, an electrical connection between the secondary battery and the primary battery is interrupted as soon as the secondary battery is discharged.

In accordance with an embodiment of the inventive subject matter, both the primary battery and the secondary battery are charged during the operation of the internal combustion engine.

The inventive subject matter furthermore also relates to an on-board power supply system of a motor vehicle which is designed to carry out a method having the above-described features.

Further embodiments of the inventive subject matter can be inferred from the description and the dependent claims. Embodiments of the inventive subject matter will be explained hereinafter on the basis of exemplary description with reference to the accompanying drawings.

DESCRIPTION OF DRAWINGS

FIG. 4 is a graph showing an example of voltage curves of battery voltage curves and a battery state of charge.

Elements and steps in the figures are illustrated for simplicity and clarity and have not necessarily been rendered according to any particular sequence. For example, steps that may be performed concurrently or in different order are illustrated in the figures to help to improve understanding of embodiments of the inventive subject matter.

DESCRIPTION OF INVENTION

While various aspects of the inventive subject matter are described with reference to a particular illustrative embodiment, the inventive subject matter is not limited to such embodiments, and additional modifications, applications, and embodiments may be implemented without departing from the inventive subject matter. In the figures, like reference numbers will be used to illustrate the same components. Those skilled in the art will recognize that the various components set forth herein may be altered without varying from the scope of the inventive subject matter.

Figure 1:
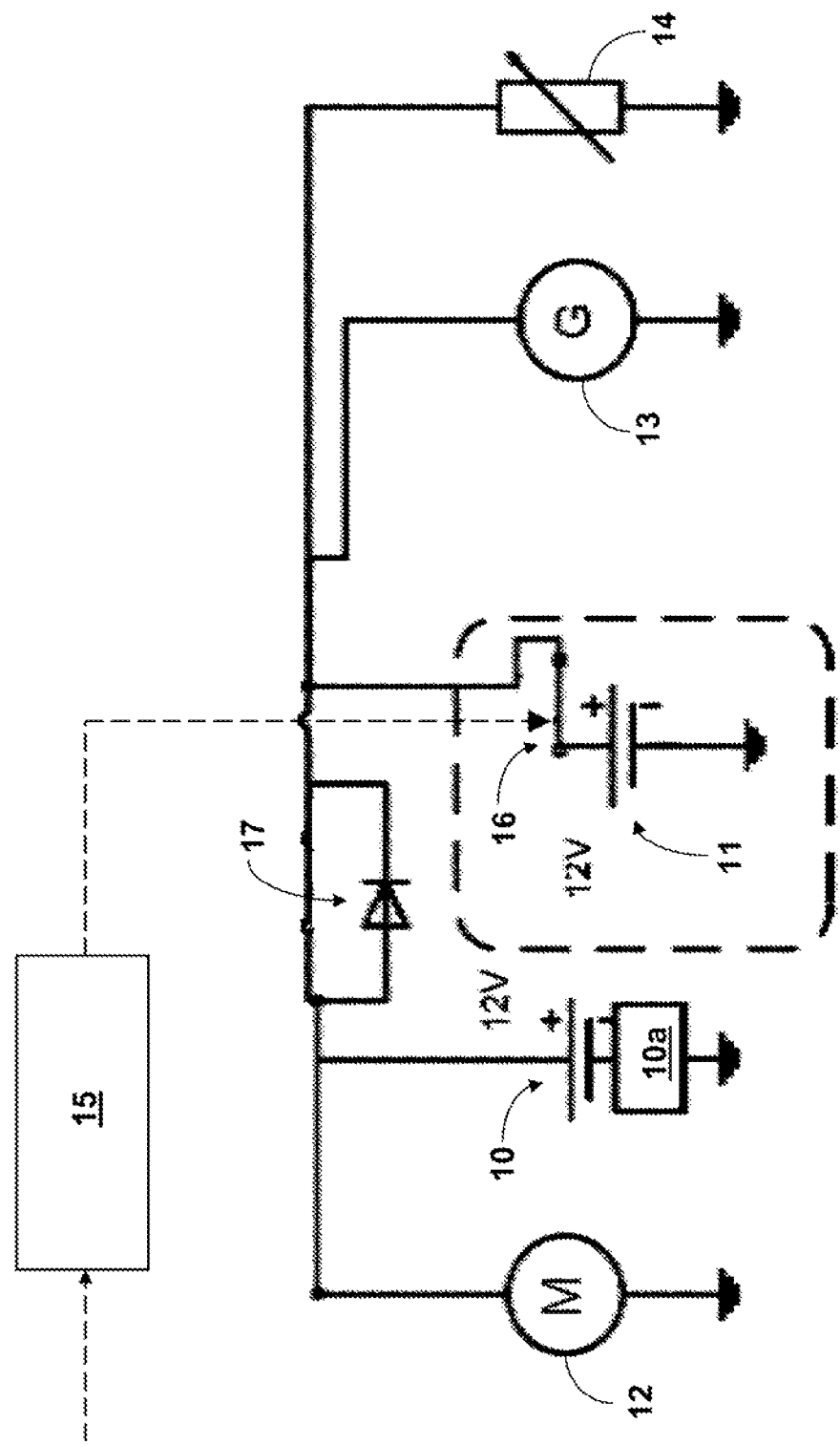
FIG. 1 is a circuit diagram of an embodiment of the inventive subject matter.

FIG. 1 is a block diagram of an on-board power supply system of a motor vehicle equipped with automatic start/stop functionality. The on-board power supply system shown in FIG. 1 is equipped with an internal combustion engine 12 and a starter generator 13, which is connected to the crankshaft of the internal combustion engine 12 and, in generator operation, feeds both as supply battery in the form of a primary (lead-acid) battery 10 and also loads or consumers 14. The starter generator 13 is used in motor operation to start the internal combustion engine 12 and is fed in this operating phase from the primary battery 10. Reference sign "10a" denotes a battery management system of the primary battery 10. According to FIG. 1, the motor vehicle on-board power supply system also has a secondary (lithium-based) battery 11, which is associated with a switch 16, wherein this switch 16 can be actuated via a circuit controller 15 depending on whether the internal combustion engine 12 is switched on or switched off.

Furthermore, a switching device 17 for decoupling the crankshaft for the purpose of implementing stop/start operation of the motor vehicle is provided in accordance with FIG. 1. The secondary battery 11 is also used in the motor vehicle on-board power supply system of FIG. 1 for energy recovery and stabilization during stop/start operation.

Figure 2:
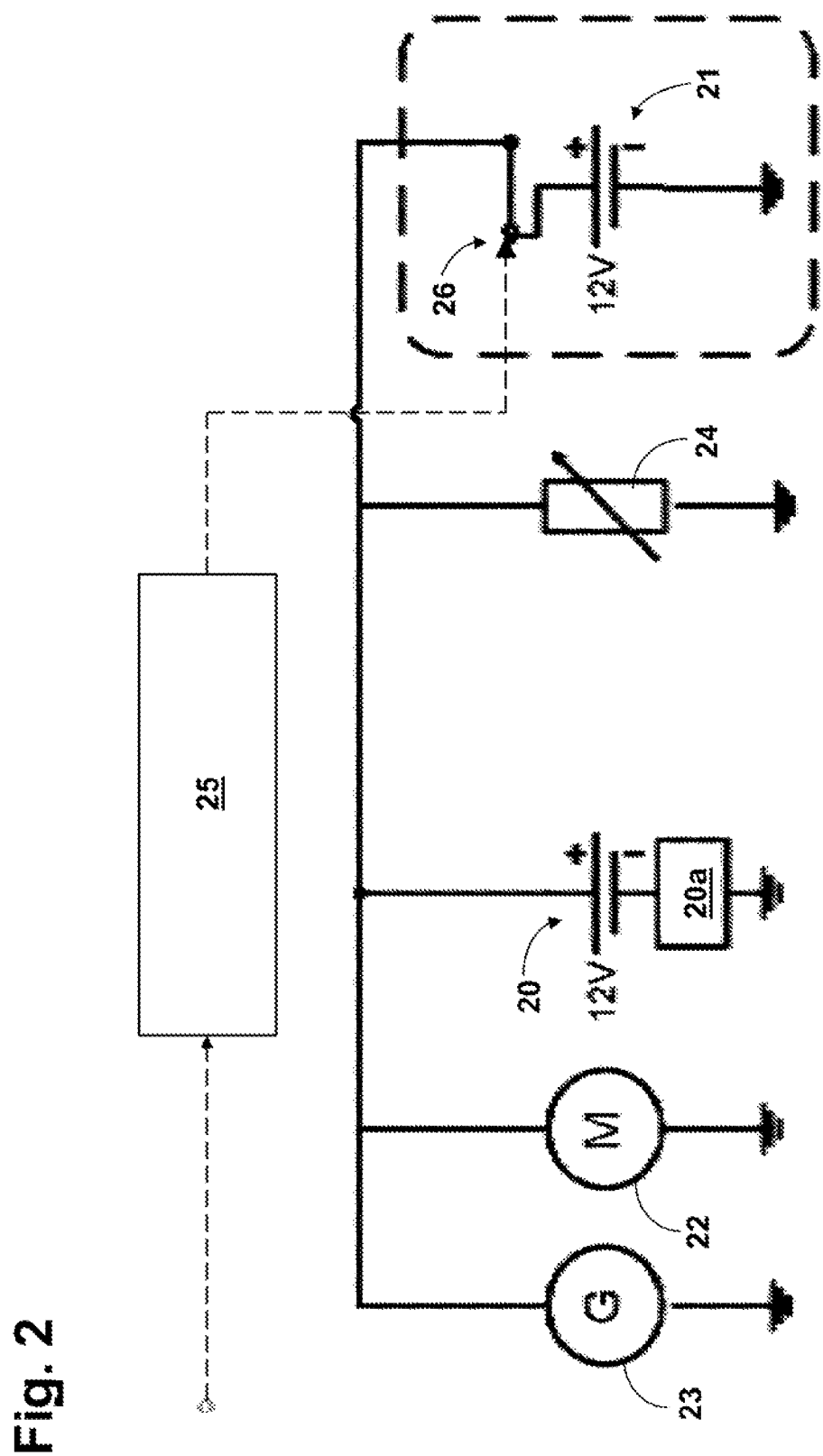
FIG. 2 is a circuit diagram of another embodiment of the inventive subject matter.

FIG. 2 shows a similar circuit arrangement in a motor vehicle without automatic stop/start function, wherein components similar to FIG. 1 or having substantially the same function are denoted by reference numbers increased by "10". The power supply system shown in FIG. 2 is equipped with an internal combustion engine 22 and a starter generator 23, which is connected to the crankshaft of the internal combustion engine 22 and, in generator operation, feeds both a supply battery in the form of a primary (lead-acid) battery 20 and also loads or consumers 24. The starter generator 23 is used in motor operation to start the internal combustion engine 22 and is fed in this operating phase from the primary battery 20. Reference sign "20a" denotes as battery management stem of the primary battery 20. According to FIG. 2, the motor vehicle on-board power supply system also has a secondary (lithium-based) battery 21, which is associated with a switch 26, wherein this switch 26 can be actuated via as circuit controller 25.

Figure 3:
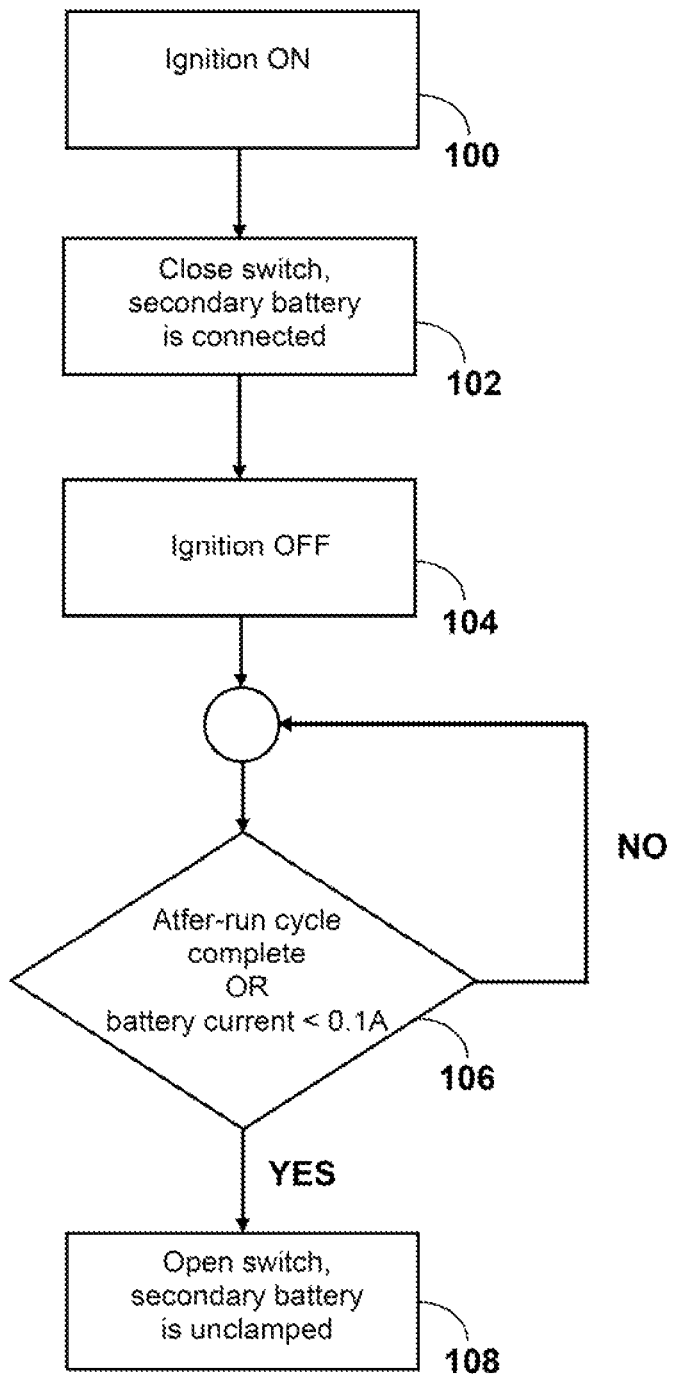
FIG. 3 is a flow diagram of a method of the inventive subject matter.

Typical operation or functioning of a motor vehicle on-board power supply system according to the inventive subject matter will be described hereinafter with reference to the flow diagram of FIG. 3. The method shown in FIG. 3 may be carried out using the circuit arrangements and the circuit controller 15, 25 described in FIGS. 1 and 2. FIG. 3 shows methods, processes and/or operations that are processible by a data processing deuce such as controller 15, 25, instructions that are tangibly embodied by non-transitory computer readable medium having instructions thereon and configured for carrying out such functionality. The instructions may be accessible by one or more data processing devices from a memory apparatus such as RAM, ROM virtual memory or hard drive memory to name a few. The instructions may inclusively or alternatively be accessible from an apparatus readably by a driver unit of a data processing system such as a diskette, a compact disk, or a tape cartridge, to name a few. Accordingly, embodiments of computer readable medium in accordance with the inventive subject matter include a compact disk, a hard drive, RAM, or other type of storage apparatus that has imaged thereon a computer program (i.e., instructions) configured for carrying out battery management functionality in accordance with the inventive subject matter. According to embodiments of the inventive subject matter, the circuit controller 15, 25 may comprise various signal interfaces for receiving and outputting signals. The circuit controller 15, 25 in the context of the inventive subject matter may be any control module of an electronic control system that provides for battery management functionality in accordance with the inventive subject matter. Furthermore, it is disclosed herein that such a control functionality may be implemented within a stand-alone control module, physically or logically, or may be implemented logically within two or more separate but interconnected control modules. In one example, battery management functionality is implemented within a stand-alone controller. In another example, battery management functionality in accordance with the inventive subject matter is implemented within a standalone controller unit of an electronic control unit of a vehicle as well as one or more other types of system control functionality of a vehicle. In still another example, battery management functionality in accordance with the inventive subject matter is implemented logically in a distributed manner whereby a plurality of control units, control modules, computers or the like jointly carry out operations for battery management functionality.

Referring now to FIG. 3, when the ignition is switched on 100, the switch 16 or 26 is closed in step 102, wherein the secondary battery 11 or 21 is electrically connected or clamped. Once the ignition has been switched off 104, it is regularly queried 106 whether the after-run cycle is complete or whether the battery current is less than 0.1 amperes (A). If this is the case in accordance with the query in step 106 (otherwise the query is repeated or step 106 is performed), the switch 16 or 26 is opened in step 108, and the secondary battery 11 or 21 is unclamped.

The switching strategy comprises a load supply both by the primary and the secondary battery during operation of the motor vehicle or the internal combustion engine and also a recharging of the primary (lead-acid) battery following the switch-off of the motor vehicle or the internal combustion engine. When the internal combustion engine 12 or 22 is in the switched-off state, the energy stored in the secondary (lithium-based) battery 11 or 21 is transferred to the primary (lead-acid) battery 10 or 20, such that the desulfation cycle can be continued when the internal combustion engine is in the switched-off state. During the next journey of the motor vehicle, both batteries are charged, and the discharge process in the primary (lead-acid) battery can be continued in the state in which the internal combustion engine or motor vehicle is switched off, until the desulfation cycle is complete.

FIG. 4 shows a graph in which exemplary voltage level curves of the batteries provided in a motor vehicle on-board power supply system according to the inventive subject matter are plotted depending on the battery state of charge (SOC). Here, "A" denotes the open circuit voltage (OCV), of the secondary (lithium-based) battery 11 or 21, "B" denotes the open circuit voltage of the primary (lead-acid) battery 10 or 20, "C" denotes the discharge limit, and "D" denotes the charge limit. Furthermore, the operating range of the secondary (lithium-based) battery 11 or 21 is denoted by "I", and the operating range of the primary (lead-acid) battery 10 or 20 is denoted by "11". The secondary (lithium-based) battery 11 or 21 preferably has a discharge voltage of which the value is above the characteristic open circuit voltage of the primary (lead-acid) battery 10 or 20.

In the foregoing specification, the inventive subject matter has been described with reference to specific exemplary embodiments. Various modifications and changes may be made, however, without departing from the scope of the inventive subject matter as set forth in the claims. The specification and figures are illustrative, rather than restrictive, and modifications are intended to be included within the scope of the inventive subject matter. Accordingly, the scope of the inventive subject matter should be determined by the claims and their legal equivalents rather than by merely the examples described.

For example, the steps recited in any method or process claims may be executed in any order and are not limited to the specific order presented in the claims. The equations may be implemented with a filter to minimize effects of signal noises. Additionally, the components and/or elements recited in any apparatus claims may be assembled or otherwise operationally configured in a variety of permutations and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

The terms "comprise", "comprises", "comprising", "having", "including", "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the inventive subject matter, in addition to those not specifically recited, may be varied or otherwise particularly adapted to specific environments, manufacturing specifications, design parameters or other operating requirements without departing from the general principles of the same.

The invention claimed is:

1. A method for desulfation of a primary battery of an on-board power supply system of a vehicle, the method comprising the steps of:
    charging and desulfating the primary battery during operation of an engine of the vehicle; and
    continuing to charge and desulfate the primary battery from a secondary battery coupled to the primary battery while the engine is not operating.

2. The method as claimed in claim 1 further comprising the step of ending charging and desulfating the primary and secondary batteries when the secondary battery is discharged.

3. The method as claimed in claim 1 further comprising the step of charging the secondary battery during operation of the engine.

4. The method as claimed in claim 1 wherein the secondary battery has a discharge voltage that is greater than an open circuit voltage of the primary battery.

5. The method as claimed in claim 1 wherein the primary battery is a lead-acid battery.

6. The method as claimed in claim 1 wherein the secondary battery is a lithium-based battery.

7. An on-board power supply system for a motor vehicle having, an internal combustion engine, comprising:
    a primary battery that is charged and desulfated during operation of the engine;
    a secondary battery coupled to the primary battery, the secondary battery charges the primary battery when the engine is not operating to continue desulfation of the primary battery.

8. The system as claimed in claim 7 wherein the secondary battery is charged during operation of the engine.

9. The system as claimed in claim 7 wherein the secondary battery has a discharge voltage that is greater than an open circuit voltage of the primary battery.

10. The system as claimed in claim 7 wherein the primary battery is a lead-acid battery.

11. The system as claimed in claim 7 wherein the secondary battery is a lithium-based battery.

12. An on-board power supply system for a vehicle having an internal combustion engine, comprising:
    a primary battery coupled to the engine and charged while the engine is operational, the primary battery is a lead-acid battery, has a predetermined open-circuit voltage, and undergoes desulfation while the engine is operational;
    a secondary battery coupled to the primary battery and the engine, the secondary battery is a lithium-based battery, has a discharge voltage that is greater than the predetermined open-circuit voltage of the primary battery, and transmits electrical energy to the primary battery when the engine is not operating to continue desulfation of the primary battery.

13. The system as claimed in claim 12 further comprising a switch coupled between the primary battery and the secondary battery wherein upon discharge of the secondary battery, the switch is open and transmission of electrical energy from the secondary battery to the primary battery is interrupted.

14. The system as claimed in claim 12 wherein the secondary battery is charged while the engine is operational.

* * * * *